United States Patent [19]

Alexandre

[11] 4,378,186
[45] Mar. 29, 1983

[54] SUPPORT FOR BROACHED WORKPIECES

[75] Inventor: Orain M. Alexandre, Conflans-Ste Honorine, France

[73] Assignee: Glaenzer Spicer, Poissy, France

[21] Appl. No.: 215,640

[22] Filed: Dec. 12, 1980

Related U.S. Application Data

[63] Continuation of Ser. No. 19,620, Mar. 12, 1979, abandoned.

[30] Foreign Application Priority Data

Mar. 28, 1978 [FR] France .................. 78 08949

[51] Int. Cl.³ .................................. B23D 41/06
[52] U.S. Cl. .................................. 409/277; 209/234; 209/266; 209/287; 279/1 F; 279/60
[58] Field of Search ............. 409/276, 277, 256, 257, 409/278, 279; 279/4, 1 F, 1 W, 49, 54, 60; 269/234, 266, 287

[56] References Cited

U.S. PATENT DOCUMENTS

| | | | |
|---|---|---|---|
| 440,255 | 11/1890 | Austin | 279/60 |
| 1,403,415 | 1/1922 | Iggberg | 279/60 |
| 1,884,717 | 10/1932 | Johansen | 279/60 X |
| 2,454,098 | 11/1948 | Schmidt | 279/1 F |
| 2,845,250 | 7/1958 | Ball | 173/166 |
| 3,633,929 | 1/1972 | Morinski et al. | 279/60 X |
| 3,692,320 | 9/1972 | Lindelofeld | 279/4 |
| 3,759,535 | 9/1973 | Hilgers | 279/60 X |
| 4,116,453 | 9/1978 | Andre | 279/4 |

FOREIGN PATENT DOCUMENTS

| | | | |
|---|---|---|---|
| 696485 | 2/1953 | United Kingdom | 279/1 F |
| 286463 | 1/1971 | U.S.S.R. | 409/277 |
| 888357 | 1/1978 | U.S.S.R. | 279/4 |

*Primary Examiner*—William R. Briggs
*Attorney, Agent, or Firm*—Schuyler, Banner, Birch, McKie & Beckett

[57] ABSTRACT

The device allows the broaching of thin-walled workpieces with high precision and an excellent surface condition. It comprises mainly a fixed support defining a radial abutment surface, a sleeve defining ramps, wedge-shaped members bearing against said ramps and against the outer surface of the workpiece. These wedge-shaped members are carried by a plate which is capable of being brought to a wedging position under the effect of springs or to a disengaged position by means of ramps.

14 Claims, 5 Drawing Figures

SUPPORT FOR BROACHED WORKPIECES

This is a continuation of application Ser. No. 19,620, filed Mar. 12, 1979, now abandoned.

The present invention relates to the broaching of tubular workpieces, especially workpieces having a thin wall, and more particularly to support devices for such workpieces which must undergo a broaching or like operation.

It is known that the broaching of thin-wall workpieces is often impossible owing to the radial deformation of the wall due to the component perpendicular to the cutting edge and to the direction of displacement of the cutting tool. This deformation results in chatter or considerable irregularity of the cut which gives an unsatisfactory surface condition and lack of precision. It has been contemplated to surround certain workpieces, such as tubes having a thin wall, so as to be able to effect localized broachings, such as the cutting of keyways or splines, but this operation requires a high precision of the outside dimension of the tube so as to achieve a good bearing throughout the inner surface of the gripping means while allowing the introduction and the disengagement of the workpiece after broaching. Now, when the workpiece has been obtained by a forming or drawing operation or some other conventional operation, its sides are not sufficiently precise and vary excessively from one workpiece to the other so that this improvement is hardly effective. Indeed, if the blank has an outside dimension exceeding the theoretical dimension, the introduction of the workpiece in the gripping means is difficult and results in a radial elastic contraction which, after disengagement from the gripping means and release, results in a lack of metal relative to the desired dimensions. On the other hand, if the blank has an outside dimension less than the theoretical dimension, the workpiece is freely introduced in the gripping means and, during the broaching operation, the workpiece elastically expands under the effect of the thrust of the cutting edges so that, after the passage of the broach, there is a contraction of the workpiece due to an elastic return to its initial shape and there is an excessive amount of metal with respect to the desired dimensions. The risk of chatter is moreover greater in this case.

An object of the invention is to permit a broaching operation which gives precise dimensions and a good surface condition on workpieces having thin walls, even if the thickness of the blanks is not maintained within very precise tolerances. The invention may in particular permit the broaching of sectional tubes obtained by drawing, rolling, welding, forging, forming, hot or cold wire drawing.

According to the invention, there is provided a device for supporting tubular workpieces for the broaching thereof, said device comprising a rigid sleeve carried by a support and defining at least one bearing surface which extends roughly in the longitudinal direction of the workpiece, at least one wedge-shaped means mounted to be longitudinally movable relative to the sleeve and in contact by a first face with the bearing surface of the sleeve, said means being shaped on a second face opposed to the first face in such manner as to fit throughout the length thereof a sector of the outer surface of the workpiece which is located in the region of a sector of said means and which must be broached, a fixed abutment surface roughly perpendicular to the longitudinal direction of the workpiece, said abutment surface having a centre opening and being adapted to cooperate with an end face of the workpiece, means for urging the or each wedge shaped means in a direction corresponding to the wedging thereof, and means for displacing the or each wedge-shaped means in the direction opposed to the wedging direction.

According to other advantageous features:

the or each bearing surface of the sleeve and the adjacent surface of the wedge-shaped means are inclined relative to the longitudinal direction of the workpiece at an angle of the order of about 2° to 10°;

another plate is provided between the support and the withdrawing and thrusting plate.

The invention will be described in more detail hereinafter with reference to the accompanying drawing, which is given solely by way of example and in which.

Figure 1:
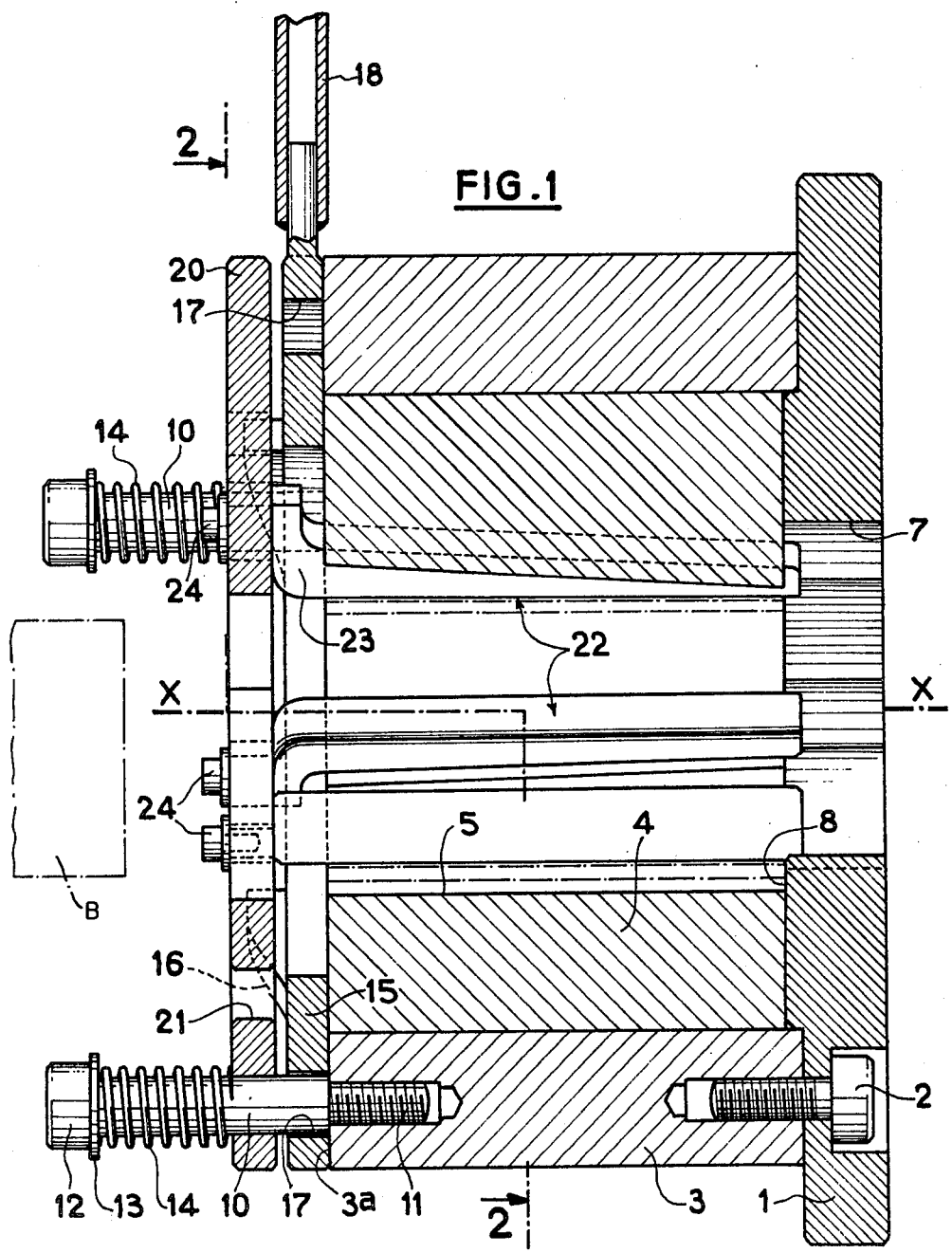
FIG. 1 is a longitudinal sectional view of a broach and a device for supporting a workpiece according to the invention.
Figure 2:
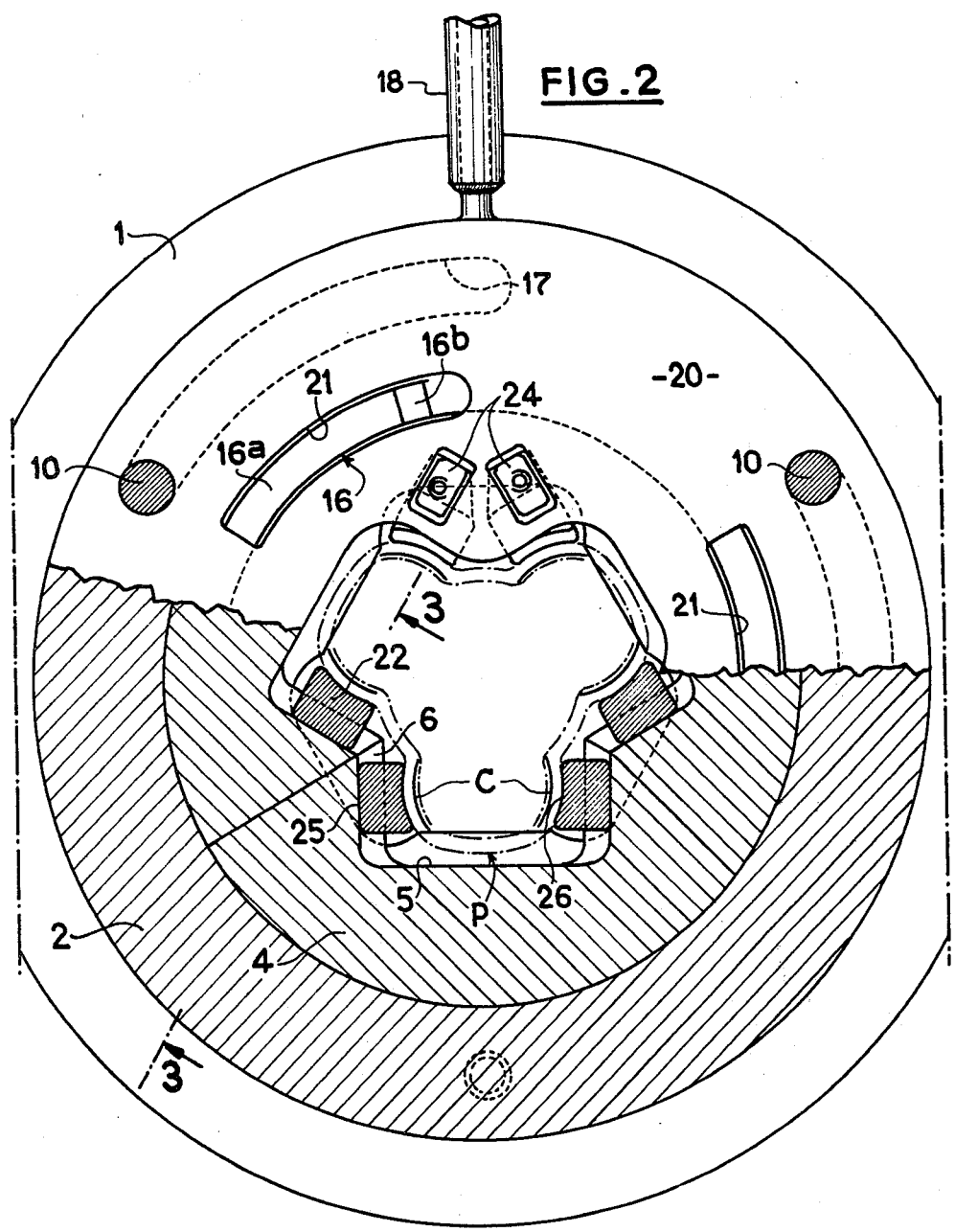
FIG. 2 is a sectional view taken on line 2—2 of FIG. 1.
Figure 3:
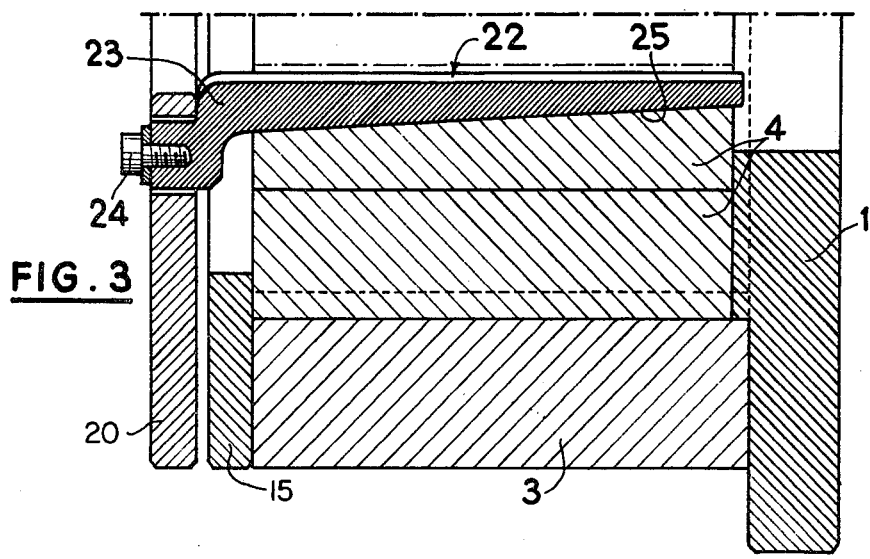
FIG. 3 is a detail sectional view taken on line 3—3 of FIG. 2.

Reference will first be made to FIGS. 1 to 3 for describing a device for supporting workpieces according to the invention which is adapted to maintain thin-walled tubular workpieces intended to be subjected to a broaching operation by a broach B. In the illustrated embodiment, it is assumed that the workpiece concerned P is a member of a tripod homokinetic joint defining three pairs of raceways C of part-circular cross-sectional shape. However, it will be understood that the sectional shape of the workpiece to be broached could be different, the device according to the invention being then modified in shape, if not in its operation, and adapted to each particular shape.

The device comprises a fixed support formed by an annular plate 1 for example fixed by screws 2 to a cylindrical ring 3. Disposed inside the ring is a rigid and massive sleeve 4 which, in the illustrated embodiment, comprises three identical parts each of which subtends an angle of 120° at the centre. Each of these three parts defines a cavity having a generally U-shaped section and comprising a flat bottom 5 and two lateral walls 6 generally oriented in the longitudinal direction of the workpiece, but inclined relative to the axis X—X of the workpiece and of the device at an angle which may be between about 2° and 10° (FIGS. 2 and 3). The walls 6 converge in the direction of the plate 1. The latter has a centre opening 7 the shape and dimension of which are such that radial abutment surfaces 8 are defined in the vicinity of the bottom 5 of the cavities of the sleeve.

Fixed on the fixed support, and more precisely on the ring 3, is a sub-assembly which comprises three guide rods 10 comprising a screwthreaded end portion 11 which is screwed in the front wall 3a of the ring 3 and a head 12 which acts as an abutment for a washer 13 against which a spring 14 bears. The sub-assembly is completed by a first plate 15 applied against the front face of the ring and carrying three ramps 16 having an inclined portion 16a and terminated in a roughly horizontal portion 16b (FIG. 2). Provided moreover in this plate 15 are three curved openings 17 which are centered on the axis X—X and through which the rods 10 extend. The plate 15 is rigid with a handle 18 whereby it is possible to rotate the plate. A second plate or holder 20 is mounted to be slidable along the guide rods 10 and is biased by yieldable means such as springs 14 toward the first plate 15. This second plate has three openings 21 into which the ramps 16 normally extend. The second plate carries six wedge-shaped members 22 which are pivoted by one end 23 to this plate to pivot about fixing members 24. These wedge-shaped members have an inclined face 25 adapted to cooperate with the adjacent lateral wall 6 of the sleeve and inclined at roughly the same angle. They also have a second face 26 which is opposed to the sliding face 25 and fits or conforms to the outer shape of the workpiece P which is to be broached, the wedge-shaped members bearing against this workpiece in zones located in the region of the zones to be machined.

Such a device is employed in the following manner. The blank of the workpiece to be machined is placed in position while the withdrawing and thrust plate 20 is brought to a withdrawn position by rotation of the handle 18 and the plate 15 and action of the ramps 16. The wedge-shaped members 22 are then moved away toward the left and allow the blank to be placed in position.

The latter bears by its right end (as viewed in the drawing) against the abutment surfaces 8 of the fixed plate 1. The thrust plate 20 is then released so as to bring it to the position shown in FIGS. 1 to 3 under the action of the springs 14. The planes 25 of the wedge-shaped members then slide along corresponding planes 6 of the sleeve and the blank is blocked in position. The slope of the wedge-shaped members is chosen to be small enough to ensure that the friction produced renders the system irreversible. These wedge-shaped members consequently maintain their initial position obtained under the action of the springs 14 during the broaching operation. During the passage of the broach B, the inner surfaces to be machined, which are formed by the surfaces of the raceways C in the presently-described embodiment, cannot bend under the effect of the component of the cutting force which is perpendicular to these surfaces since the wedge-shaped members firmly maintain the corresponding outer zone of the blank since they are themselves supported on the inclined planes of the rigid sleeve. In this way, there is achieved a broaching of a thin-walled and flexible workpiece with the same precision as if it were thick and radially rigid.

When the broaching operation has finished, the workpiece is disengaged by turning the intermediate plate 15 so as to shift the plate 20 and the wedge-shaped members 22 toward the left.

It will be understood that the means employed for disengaging or bringing into engagement the wedging device may be modified without departing from the scope of the invention. Thus, the camming mechanism may be replaced by hydraulic jacks which urge the plate 20 in the direction of axis X—X, or by any other more or less complicated like arrangement.

Figure 4:
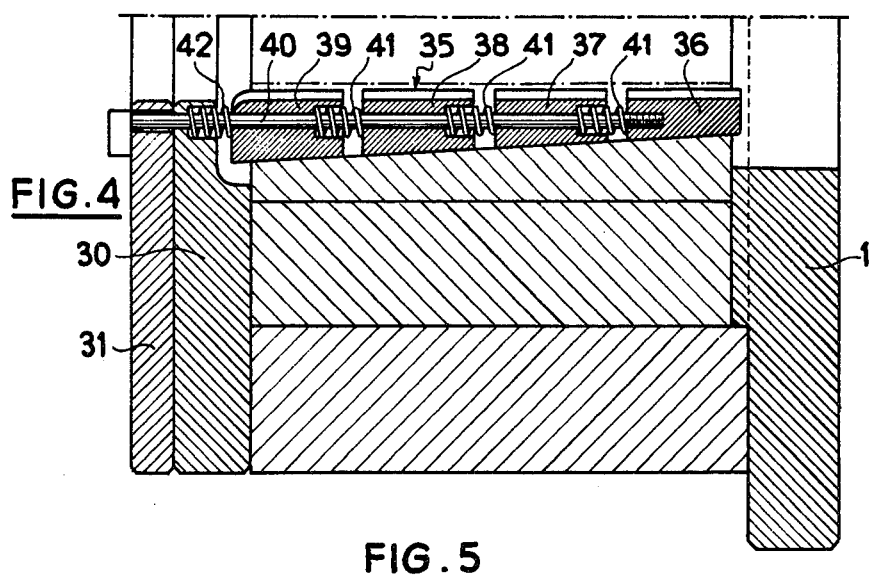
FIGS. 4 and 5 are views similar to FIG. 3 of a modification of the device.
Figure 5:
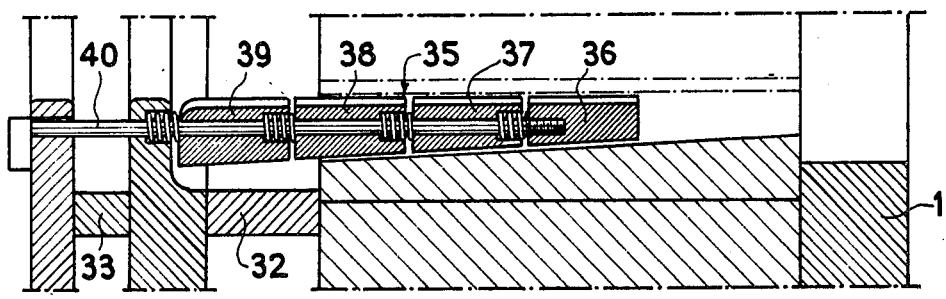

FIGS. 4 and 5 show a modification of the device according to the invention which has on the whole the same structure, but differs from the embodiment shown in FIGS. 1 to 3 by the following points. First, the two plates 30, 31 which correspond to the plates 15 and 20 of the first embodiment are assumed to be slidably mounted on rods such as the rods 10 (not shown in FIGS. 4 and 5). Springs, such as the springs 14, are also provided. It is assumed that each of these plates may be moved manually away from the adjacent face of the sleeve and of the ring and maintained in a withdrawn position by means of spacer blocks 32, 33 shown in FIG. 5.

Further, each block 35 is here formed by a plurality of sections 36, 37, 38, 39, an end section 36 of which is fixed to a rod 40 which is pivoted to the withdrawing and thrust plate 31. The other sections are mounted to be slidable on this rod and spaced apart from each other by springs 41. A spring 42 is also provided between the section 39 and the plate 30.

After the sectional blank to be broached has been placed in position, which abuts as before against the end plate 1, the plates 30, 31 and the wedge-shaped members 35 are released so that the elementary wedge-sections bear against the inclined planes 6 of the sleeve 4 and the outer faces of the wall of the workpiece to be broached. This wall is thus firmly maintained throughout its length and any possible variations in thickness or shape between the two ends of the blank are compensated for, since each one of the elementary wedges moves until it reaches a wedging position in accordance with the available space.

The fact of providing two blocks 32, 33 respectively between the front wall of the fixed support and the plate 30, and between the two plates 30 and 31, enables the wedge withdrawal travel to be increased and facilitates the disengagement and the placing in position of the workpieces. It will be understood that if this is sufficient, only the plate 31, could be axially displaced, as in the embodiment shown in FIGS. 1 to 3.

Having now described our invention what we claim as new and desire to secure by Letters Patent is:

1. A structure comprising in combination a device for supporting non-circular tubular thin-walled workpieces for the internal broaching of a localized sector thereof and a broach adapted for broaching said localized sector, said device comprising a support, a rigid sleeve having a longitudinal axis and carried by the support and defining at least one bearing surface, a holder mounted on the support to be movable relative to the sleeve in a direction substantially parallel to said axis, at least one wedge-shaped means movably mounted on the holder and having a first face in contact with the bearing surface of the sleeve, said wedge-shaped means having a second face opposed to the first face for fitting throughout its length a sector of the outer surface of the workpiece which is located opposite the sector of the workpiece which is engaged by said broach, means defining a fixed abutment surface substantially perpendicular to said axis and defining a broach-clearing centre opening, the abutment surface being adapted to cooperate with an end face of the workpiece, yieldable means for shifting the holder in a first direction and placing the wedge-shaped means in a wedging position thereof in which position the wedge-shaped means are engaged between said bearing face and said sector of the workpiece solely under the action of said yieldable means to block the workpiece in position without exertion of a deforming force on the workpiece, means for shifting the holder in a direction opposed to said first direction when it is required to remove the workpiece, said first face and said bearing surface making an angle with said axis which is such as to maintain the wedge-shaped means in the workpiece-engaging position thereof under the mere effect of friction between said first face and said bearing surface of the sleeve.

2. A structure as claimed in claim 1, comprising a plurality of said wedge-shaped means.

3. A structure as claimed in claim 1, wherein the bearing surface of the sleeve and the adjacent first face of the wedge-shaped means are inclined relative to said axis of the sleeve at an angle of substantially 2° to 10°.

4. A device for supporting tubular workpieces for the broaching thereof, said device comprising a support, a rigid sleeve carried by the support and defining at least one bearing surface which extends roughly in a longitudinal direction of the workpiece, at least one wedge-shaped means mounted to be longitudinally movable relative to the sleeve and having a first face in contact with the bearing surface of the sleeve, said wedge-shaped means having a second face opposed to the first face for fitting throughout its length a sector of the outer surface of the workpiece which is located in the region of a sector of the workpiece which must be broached, means defining a fixed abutment surface substantially perpendicular to the longitudinal direction of the workpiece and defining a centre opening, the abutment surface being adapted to cooperate with an end face of the workpiece, means for urging the wedge-shaped means in a direction corresponding to a wedging thereof, and means for shifting the wedge-shaped means in a direction opposed to the wedging direction, the wedge-shaped means comprising a plurality of sections, guide means and springs disposed between adjacent sections, at least some of said sections being mounted to be slidable along the guide means.

5. A device as claimed in claim 4, comprising guide means rigid with the support, and a withdrawing and thrust plate which is mounted to be slidable in a direction parallel to the longitudinal direction of the workpiece on said guide means rigid with the support.

6. A device as claimed in claim 5, wherein the wedge-shaped means is pivoted to the withdrawing and thrust plate.

7. A device as claimed in claim 5, comprising a second plate disposed between the support and the withdrawing and thrust plate and movable relative to the support, means in combination with the second plate and the withdrawing and thrust plate whereby movement of said second plate causes the withdrawing and thrust plate to move in a direction opposed to the wedging direction.

8. A device as claimed in claim 7, wherein the second plate is slidably mounted on said guide means rigid with the support.

9. A device as claimed in claim 5, wherein a second plate is disposed between the support and the withdrawing and thrust plate and is mounted to be rotatable relative to the support and relative to the withdrawing and thrust plate and comprises ramps which engage the withdrawing and thrust plate and are operative to move the withdrawing and thrust plate away from the support in opposition to said yieldable force-exerting means.

10. A device as claimed in claim 4, wherein the means for urging the wedge-shaped means in the wedging direction thereof are elastically yieldable means.

11. A device as claimed in claim 10, wherein guide rods are mounted on the support and said means for urging the wedge-shaped means comprise a withdrawing and thrust plate slidably mounted on the guide rods, the elastically yieldable means being interposed between bearing surfaces on the guide rods and the withdrawing and thrust plate.

12. A device as claimed in claim 4, wherein the support comprises a plate defining the radial abutment surface for the workpiece and a ring in which the sleeve is received.

13. A device for supporting non-circular tubular workpieces for the internal broaching of a localized sector thereof, said device comprising a support, a rigid sleeve having a longitudinal axis and carried by the support and defining at least one bearing surface, a holder mounted on the support to be movable relative to the sleeve in a direction substantially parallel to said axis, at least one wedge-shaped means movably mounted on the holder and having a first face in contact with the bearing surface of the sleeve, said wedge-shaped means having a second face opposed to the first face for fitting throughout its length a sector of the outer surface of the workpiece which is located opposite the sector of the workpiece which must be broached, means defining a fixed abutment surface substantially perpendicular to said axis and defining a broach-clearing centre opening, the abutment surface being adapted to cooperate with an end face of the workpiece, yieldable means for shifting the holder in a first direction and placing the wedge-shaped means in a wedging position thereof in which position the wedge-shaped means are engaged between said bearing face and said sector of the workpiece solely under the action of said yieldable means to block the workpiece in position without exertion of a deforming force on the workpiece, means for shifting the holder in a direction opposed to said first direction when it is required to remove the workpiece, said first face and said bearing surface making an angle with said axis which is such as to maintain the wedge-shaped means in the workpiece-engaging position thereof under the mere effect of friction between said first face and said bearing surface of the sleeve, further comprising a member disposed between the holder and the support and mounted to be rotatable about said axis relative to the holder and the support, cam means interposed between the holder and the member for moving the holder in a direction opposed to said first direction upon rotation of said member relative to the support, and means for rotating said member.

14. A device as claimed in claim 13, wherein a plurality of said wedge-shaped means and bearing surfaces are provided and said yieldable means for shifting the holder in said first direction are spring means whose force is sufficient to place the wedge-shaped means in their wedging position to block the workpiece in position without gripping the workpiece.

* * * * *

UNITED STATES PATENT AND TRADEMARK OFFICE
CERTIFICATE OF CORRECTION

PATENT NO. : 4,378,186
DATED : March 29, 1983
INVENTOR(S) : Michel A. Orain

It is certified that error appears in the above-identified patent and that said Letters Patent is hereby corrected as shown below:

On The Title Page the inventor Item [75] should read:

Michel A. Orain

Signed and Sealed this

*Twenty-eighth* Day of *June 1983*

[SEAL]

*Attest:*

*Attesting Officer*

GERALD J. MOSSINGHOFF

*Commissioner of Patents and Trademarks*